US009624960B2

(12) United States Patent
Ishihara (10) Patent No.: US 9,624,960 B2
(45) Date of Patent: Apr. 18, 2017

(54) TWO-MEMBER CONNECTING STRUCTURE

(71) Applicant: KEIHIN CORPORATION, Shinjuku-ku, Tokyo (JP)

(72) Inventor: Kei Ishihara, Tochigi (JP)

(73) Assignee: Keihin Corporation, Tokyo (JP)

( * ) Notice: Subject to any disclaimer, the term of this patent is extended or adjusted under 35 U.S.C. 154(b) by 134 days.

(21) Appl. No.: 14/645,481

(22) Filed: Mar. 12, 2015

(65) Prior Publication Data

US 2015/0261228 A1    Sep. 17, 2015

(30) Foreign Application Priority Data

Mar. 14, 2014 (JP) .................................. 2014-051980

(51) Int. Cl.

| F16K 11/16 | (2006.01) |
|---|---|
| F16B 21/10 | (2006.01) |
| F16B 21/18 | (2006.01) |
| F02M 21/02 | (2006.01) |
| F02M 21/06 | (2006.01) |

(52) U.S. Cl.
CPC ......... *F16B 21/10* (2013.01); *F02M 21/0233* (2013.01); *F02M 21/06* (2013.01); *F16B 21/186* (2013.01); *Y10T 137/7801* (2015.04); *Y10T 137/8704* (2015.04); *Y10T 137/87016* (2015.04); *Y10T 403/60* (2015.01)

(58) Field of Classification Search
CPC ........... Y10T 137/7782; Y10T 137/782; Y10T 137/87016; Y10T 137/8704
See application file for complete search history.

(56) References Cited

U.S. PATENT DOCUMENTS

| 8,714,178 B2 * | 5/2014 | Yamamoto | ............. F02M 21/06 137/15.17 |
| 2010/0024904 A1 * | 2/2010 | Hoffman | ................. F17C 13/04 137/561 R |
| 2011/0277854 A1 * | 11/2011 | Yamamoto | ......... G05D 16/0655 137/455 |

FOREIGN PATENT DOCUMENTS

| JP | 2011196362 A | * | 10/2011 |
| JP | 2014-010784 A |  | 1/2014 |

* cited by examiner

*Primary Examiner* — R. K. Arundale
(74) *Attorney, Agent, or Firm* — Carrier Blackman & Associates, P.C.; William D. Blackman; Jingli Wang (57) ABSTRACT

A first member having a first lock groove and a second member having a connection hole for insertion of the first member and a second lock groove opened to an inner periphery of the hole, are connected via a lock ring having a circular section and engaging with the grooves. An outer diameter of the ring under a load-free condition is set not less than a diameter of a groove bottom surface of the second lock groove. A reduced-diameter guide hole portion for guiding the ring to the second lock groove while reducing a diameter of the ring, is adjacently disposed short of the second lock groove in an insertion direction of the first member. A depth from an inner peripheral surface of the guide hole portion to a groove bottom surface of the second lock groove is set less than a radius of the circular section of the ring.

3 Claims, 5 Drawing Sheets

TWO-MEMBER CONNECTING STRUCTURE

BACKGROUND OF THE INVENTION

Field of the Invention

The present invention relates to a two-member connecting structure for connecting via a lock ring a first member, which is provided with a first lock groove in an outer periphery of the first member, and a second member, which includes a connection hole permitting insertion of the first member therethrough, the second member being provided with a second lock groove opened to an inner periphery of the connection hole, and the lock ring being formed in a substantially C shape while having a circular section, and engaging with the first and second lock grooves.

Description of the Related Art

As for a decompression valve, Japanese Patent Application Laid-open No. 2014-10784 has made known a connecting structure for connecting via a lock ring a holding plate as a first member, which is provided with a first lock groove in its outer periphery, and a diaphragm rod as a second member, which includes a connection hole permitting insertion of the holding plate therethrough, and which is provided with a second lock groove opened to an inner periphery of the connection hole, the lock ring being formed in a substantially C shape while having a circular section, and engaging with the first and second lock grooves. The configuration of the connecting structure is as follows. When the lock ring is in engagement with the second lock groove, a half or more of the section of the lock ring is inside the second lock groove. When the holding plate and the diaphragm rod are acted on by external force which separates the holding plate and the diaphragm rod from each other, force in an axial direction which is part of force acting on the lock ring from the holding plate is received by a side surface, located on an open end side of the connection hole, which is one of the opposite side surfaces of the second lock groove in the axial direction, and force in a direction perpendicular to the axial direction is received by a groove bottom surface of the second lock groove. Movement of the lock ring is restricted by the one side surface of the second lock groove and the groove bottom surface. Thereby, the holding plate and the diaphragm rod are kept connected to each other.

Furthermore, an outer diameter of the lock ring under a load-free condition where no external force acts on the lock ring is set larger than a diameter of the groove bottom surface of the second lock groove which is opened to the inner periphery of the connection hole. When the holding plate is inserted into the connection hole with the lock ring engaging with the first lock groove, the lock ring comes into contact with an inner periphery of a part of the connection hole which is located short of the second lock groove in an insertion direction of the holding plate into the connection hole, and thus reduces its diameter. When the lock ring reaches the second lock groove, the lock ring increases its diameter, and engages with the second lock groove. Thereby, the holding plate is connected to the diaphragm rod.

In the connecting structure disclosed in Japanese Patent Application Laid-open No. 2014-10784, however, a depth from an inner peripheral surface of the part of the connection hole, which is located short of the second lock groove in the insertion direction of the holding plate into the connection hole, to the groove bottom surface of the second lock groove is larger than a radius of the circular section of the lock ring. When the holding plate and the diaphragm rod are connected together, the diameter of the lock ring needs to be largely reduced from a diametrical dimension of the circular section of the lock ring. For this reason, larger force is needed to insert the holding plate into the connection hole while reducing the diameter of the lock ring, and ease of assembly is degraded. Furthermore, if the lock ring is deformed into a plastic deformation range, there is likelihood that: the lock ring no longer returns to the original outer diameter even under a load-free condition; and an engagement failure occurs so that strength of connection between the holding plate and diaphragm rod decreases.

SUMMARY OF THE INVENTION

The present invention has been made with the foregoing situation taken into consideration. An object of the present invention is to provide a two-member connecting structure able to reduce an amount by which the diameter of a lock ring is reduced when two members are connected together by use of the lock ring, as well as to avoid degradation of ease of assembly and occurrence of failure in engagement.

In order to achieve the object, according to a first aspect of the present invention, there is provided a two-member connecting structure for connecting via a lock ring a first member, which is provided with a first lock groove in an outer periphery of the first member, and a second member, which includes a connection hole permitting insertion of the first member therethrough, the second member being provided with a second lock groove opened to an inner periphery of the connection hole, the lock ring being formed in a substantially C shape while having a circular section, and engaging with the first and second lock grooves, wherein an outer diameter of the lock ring under a load-free condition is set equal to or larger than a diameter of a groove bottom surface of the second lock groove, a reduced-diameter guide hole portion forms part of the connection hole, and is adjacently disposed short of the second lock groove in an insertion direction of the first member into the connection hole, the reduced-diameter guide hole portion guiding the lock ring to a side of the second lock groove while reducing a diameter of the lock ring when the first member is inserted into the connection hole with the lock ring engaging with the first lock groove, and a depth from an inner peripheral surface of the reduced-diameter guide hole portion to the groove bottom surface of the second lock groove is set less than a radius of the circular section of the lock ring.

According to the first aspect of the present invention, the reduced-diameter guide hole portion, which forms part of the connection hole so as to reduce the diameter of the lock ring, is adjacently disposed short of the second lock groove in the insertion direction of the first member into the connection hole; and the depth from the inner peripheral surface of the reduced-diameter guide hole portion to the groove bottom surface of the second lock groove is set less than the radius of the circular section of the lock ring. For these reasons, it is possible to reduce an amount by which the diameter of the lock ring is reduced by the reduced-diameter guide hole portion when the first member is inserted into the connection hole with the lock ring engaging with the first lock groove; and it is possible to decrease force with which the first member is inserted into the connection hole by reducing the diameter of the lock ring, and thus to enhance ease of assembly. Furthermore, reduction in an amount of deformation of the lock ring makes it possible to prevent occurrence of failure in engagement of the lock ring due to its plastic deformation.

According to a second aspect of the present invention, in addition to the first aspect, in a state where the first member and the second member connected together via the lock ring are acted on by external force in a direction of separating the first member and the second member from each other, a first slant face is formed in the first member, the first slant face coming into contact with part of an outer periphery of the circular section of the lock ring between a front end in the insertion direction and an inner end in a radial direction, and a second slant face is formed in the second member, the second slant face coming into contact with part of the outer periphery of the circular section of the lock ring between a rear end in the insertion direction and an outer end in the radial direction.

According to the second aspect of the present invention, when the first and second members connected together via the lock ring are acted on by the external force in the direction of separating the first and second members from each other, the first and second members come into surface contact with the lock ring. Thus, it is possible to eliminate a likelihood that corners of the respective first and second members hit the lock ring so as to abrade and bite into the lock ring.

According to a third aspect of the present invention, in addition to the second aspect, the first slant face and the second slant face are formed such that an intersection point of extension lines from the respective slant faces exists inside the lock ring in the radial direction.

According to the third aspect of the present invention, the extension line from the first slant face formed in the first member so as to come into contact with the lock ring, and the extension line from the second slant face formed in the second member so as to come into contact with the lock ring are designed to intersect each other at the radial inside of the lock ring. Thereby, when the first and second members connected together via the lock ring are acted on by the external force in the direction of separating the first and second members from each other, resultant force of forces acting on the lock ring from the respective first and second slant faces is directed outward. Thus, outward movement of the lock ring is restricted by the groove bottom surface of the second lock groove. Accordingly, the lock ring is unlikely to come out of the second lock groove, as well as the first and second members are securely kept connected to each other.

According to a fourth aspect of the present invention, in addition to any one of the first to third aspects, a member, which forms part of a decompression valve opening and closing in response to movement of a decompression valve body caused by operation of a diaphragm and is connected on a side of the decompression valve body, and a member, which is connected on a side of the diaphragm, are connected together such that one of the members is the first member, and the other is the second member.

According to the fourth aspect of the present invention, it is possible to enhance ease of assembly, and reliability, of the connecting structure for the decompression valve between the diaphragm and the decompression valve body.

According to a fifth aspect of the present invention, in addition to any one of the first to third aspects, a main valve body and an auxiliary valve body are connected to each other such that one of the main valve body and the auxiliary valve body is the first member, the other is the second member, and an amount of relative movement between the main valve body and the auxiliary valve body is controlled, the main valve body having a pilot port, and the auxiliary valve body opening and closing the pilot port by its movement relative to the main valve body within a predetermined range, and forming part of a valve with a pilot function together with the main valve body.

According to the fifth aspect of the present invention, it is possible to enhance ease of assembly, and reliability, of the connecting structure for connecting the main valve body and the auxiliary valve body in the valve with the pilot function.

The above and other objects, characteristics and advantages of the present invention will be clear from detailed descriptions of the preferred embodiment which will be provided below while referring to the attached drawings.

DESCRIPTION OF THE PREFERRED EMBODIMENT

Descriptions will be provided for an embodiment of the present invention by referring to the accompanying drawings. First of all, in FIG. 1, this decompressor is, for example, that which is installed in an engine room of a fuel gas vehicle for the purpose of decompressing high-pressure natural gas fuel and supplying the resultant natural gas fuel to an engine (not illustrated). The decompressor is formed from a decompression valve 6 and a shut-off valve 7 which are provided to a body 5. The decompression valve 6 includes a decompression valve body 10 which is connected to a diaphragm 8. The shut-off valve 7 includes a shut-off valve body 78 which is driven by a solenoid 9.

Figure 1:
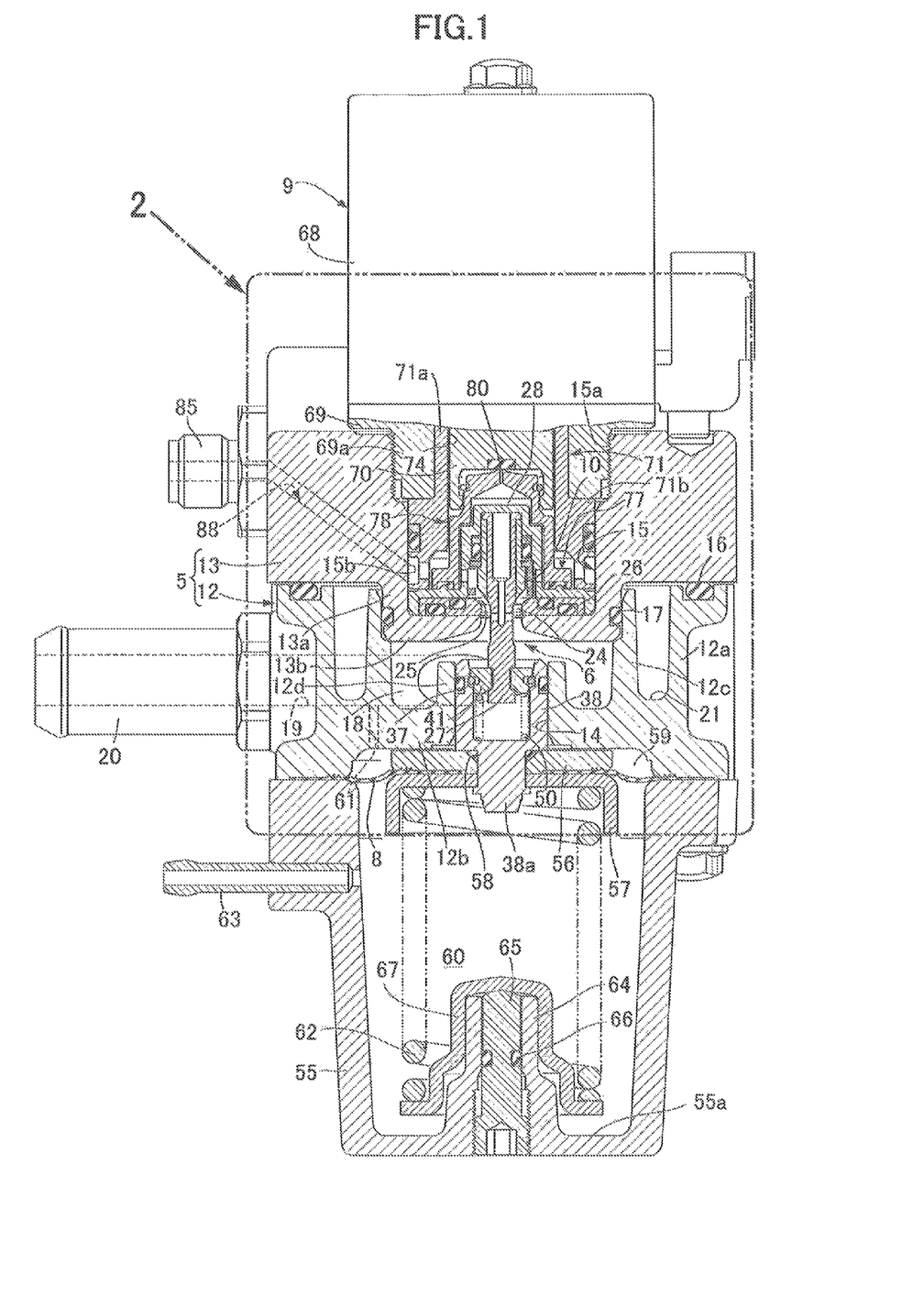
FIG. 1 is a longitudinal cross-sectional view of a decompressor which opens a decompression valve and closes a shut-off valve.

The body 5 is formed by connecting a first body member 12 and a second body member 13 which is placed above the first body member 12. The first body member 12 integrally includes: an outer tube portion 12a extending upward and downward; a first inward-facing flange portion 12b bulging radially inward from a lower portion of the outer tube portion 12a; an inner tube portion 12c being coaxially with the outer tube portion 12a, and extending upward from an intermediate portion of the first inward-facing flange portion 12b; and a short tube portion 12d being coaxially with the inner tube portion 12c, and slightly extending upward from an inner periphery of the first inward-facing flange portion 12b. A sliding support hole 14 is formed in a central portion of the first inward-facing flange portion 12b, and the short tube portion 12d. The sliding support hole 14 is coaxial with the outer tube portion 12a and the inner tube portion 12c and has a circular cross section.

The second body member 13 integrally includes a fitting tube portion 13a to be fitted into an end portion of the inner tube portion 12c on a second body member 13 side. The second body member 13 is provided with a housing hole 15 whose part is formed in the fitting tube portion 13a. In addition, the second body member 13 is integrally provided with a second inward-facing flange portion 13b bulging radially inward from an end portion of the housing hole 15 on a diaphragm 8 side, namely from a tip end portion of the fitting tube portion 13a. Furthermore, the housing hole 15 is formed by consecutively providing a threaded hole portion 15a and a fitting hole portion 15b which are coaxial with each other. The threaded hole portion 15a is opened on a side opposite to the diaphragm 8. The fitting hole portion 15b is smaller in diameter than the threaded hole portion 15a, and is placed on a side of the second inward-facing flange portion 13b.

An annular first seal member 16 is installed between the outer tube portion 12a of the first body member 12 and the second body member 13. An annular second seal member 17 is installed between the inner tube portion 12c and the fitting tube portion 13a of the second body member 13 which is fitted into the inner tube portion 12c of the first body member 12.

A decompression chamber 18 is formed between the first and second body members 12, 13 in a way that its outer periphery is defined by the inner tube portion 12c of the first body member 12. An outlet passage 19 communicating with the decompression chamber 18 is connected to a connecting pipe 20 jutting out from a side surface of the first body member 12. Furthermore, an annular passage 21 whose outer and inner peripheries are respectively defined by the outer and inner tube portions 12a, 12c of the first body member 12 is formed between the first and second body members 12, 13. A heating medium, such as hot water or the like, for heating an inside of the decompression chamber 18 flows inside the annular passage 21.

Figure 2:
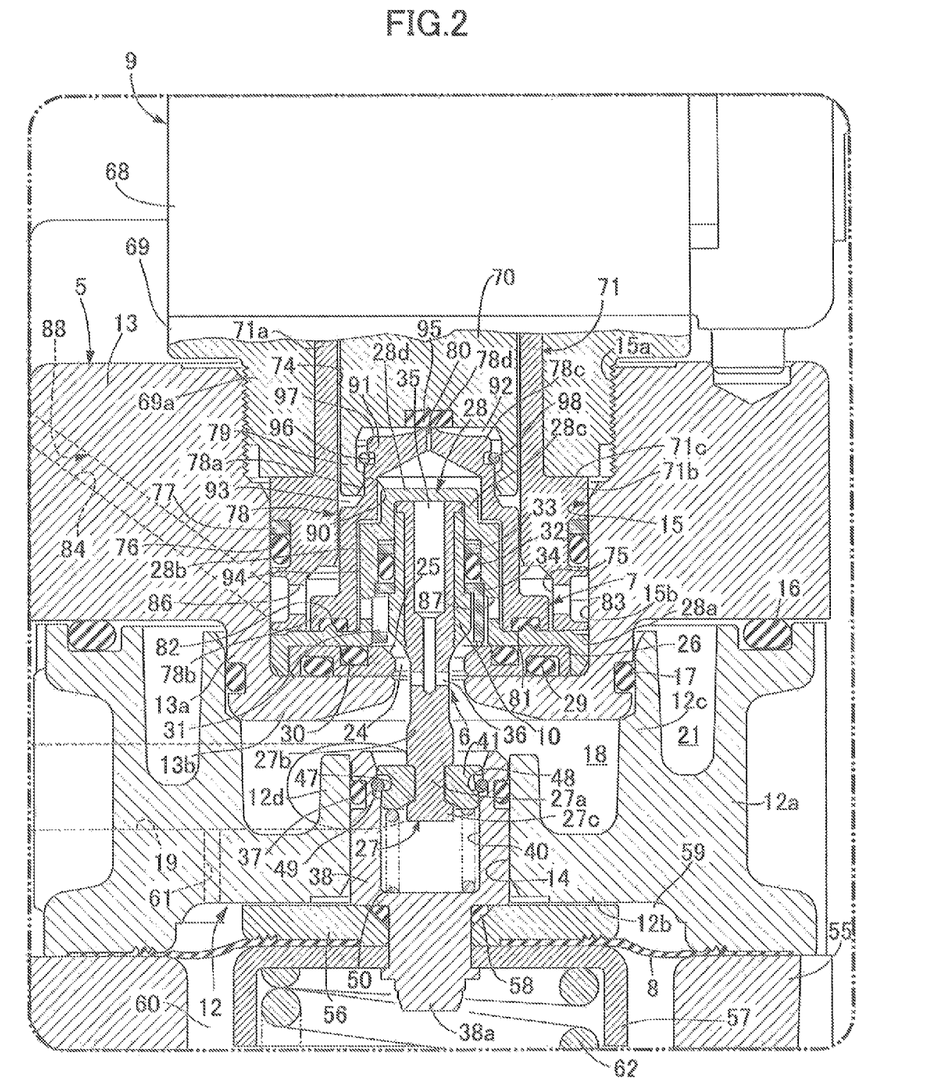
FIG. 2 is an enlarged view of a section indicated with an arrow 2 of FIG. 1.

Referring to FIG. 2 together, the decompression valve 6 includes: a valve seat member 26 having a decompression valve seat 25 in its inner periphery, formed in a ring shape, and fixedly placed inside the fitting hole portion 15b of the housing hole 15; a valve shaft 27 loosely penetrating through an inside of the second inward-facing flange portion 13b and the valve hole 24; and the decompression valve body 10 capable of being seated on the decompression valve seat 25, fitted to an outer periphery of the valve shaft 27, and made from a synthetic resin. A valve hole 24 communicating with the decompression chamber 18 is opened in a central portion of the decompression valve seat 25.

A housing 28 is inserted into and fixed to the fitting hole portion 15b of the housing hole 15. The housing 28 integrally includes: a disk-shaped holding portion 28a opened toward the second inward-facing flange portion 13b; a large-diameter cylindrical portion 28b coaxially connecting to a central portion of the holding portion 28a, and extending in a direction opposite to the second inward-facing flange portion 13b; a small-diameter cylindrical portion 28c formed smaller in diameter than the large-diameter cylindrical portion 28b, and coaxially connecting to the large-diameter cylindrical portion 28b; and an end wall portion 28d closing an end portion of the small-diameter cylindrical portion 28c which is opposite from the second inward-facing flange portion 13b. The valve seat member 26 is press-fitted into and fixed to the holding portion 28a of the housing 28.

An annular third seal member 29 which is coaxial with the valve hole 24 is installed on a surface of the valve seat member 26 which faces the second inward-facing flange portion 13b. An annular fourth seal member 30 which is coaxial with the third seal member 29 is installed on a surface of the valve seat member 26 which faces the housing 28.

A valve chamber 31 housing the decompression valve body 10 is formed in the housing 28. The decompression valve seat 25 is formed on an inner peripheral edge of the valve seat member 26 so as to face the valve chamber 31 and have a tapered shape. A part of the decompression valve body 10 which gets seated on the decompression valve seat 25 is also formed in a tapered shape.

The decompression valve body 10 is slidably supported by the large-diameter cylindrical portion 28b and the small-diameter cylindrical portion 28c of the housing 28. An annular fifth seal member 32 for guiding the movement of the decompression valve body 10 while in sliding contact with an outer periphery of the decompression valve body 10 is installed between the large-diameter cylindrical portion 28b and the decompression valve body 10. Furthermore, a first backup ring 33 is disposed between the fifth seal member 32 and a step portion between the large-diameter cylindrical portion 28b and the small-diameter cylindrical portion 28c. A cage-shaped support member 34 is clamped between the large-diameter cylindrical portion 28b and the valve seat member 26. The fifth seal member 32 is put between the support member 34 and the first backup ring 33.

Meanwhile, the decompression valve body 10 is movable between a valve-opened position (a position indicated with a solid line in FIG. 2) where the decompression valve body 10 is upwardly away from the decompression valve seat 25 and a valve-closed position where the decompression valve body 10 is seated on the decompression valve seat 25. A back pressure chamber 35 is formed among the valve shaft 27, the decompression valve body 10, as well as the small-diameter cylindrical portion 28c and the end wall portion 28d of the housing 28 in a way that the fifth seal member 32 seals an interstice between the back pressure chamber 35 and the valve chamber 31. The back pressure chamber 35 communicates with the decompression chamber 18 via a communication passage 36 provided to the valve shaft 27.

A diaphragm rod 38 having an annular sixth seal member 37 on its outer periphery is slidably fitted into the sliding support hole 14 which is formed inside the short tube portion 12d in a central portion of the first body member 12. The sixth seal member 37 is elastically in sliding contact with an inner periphery of the sliding support hole 14.

Figure 3:
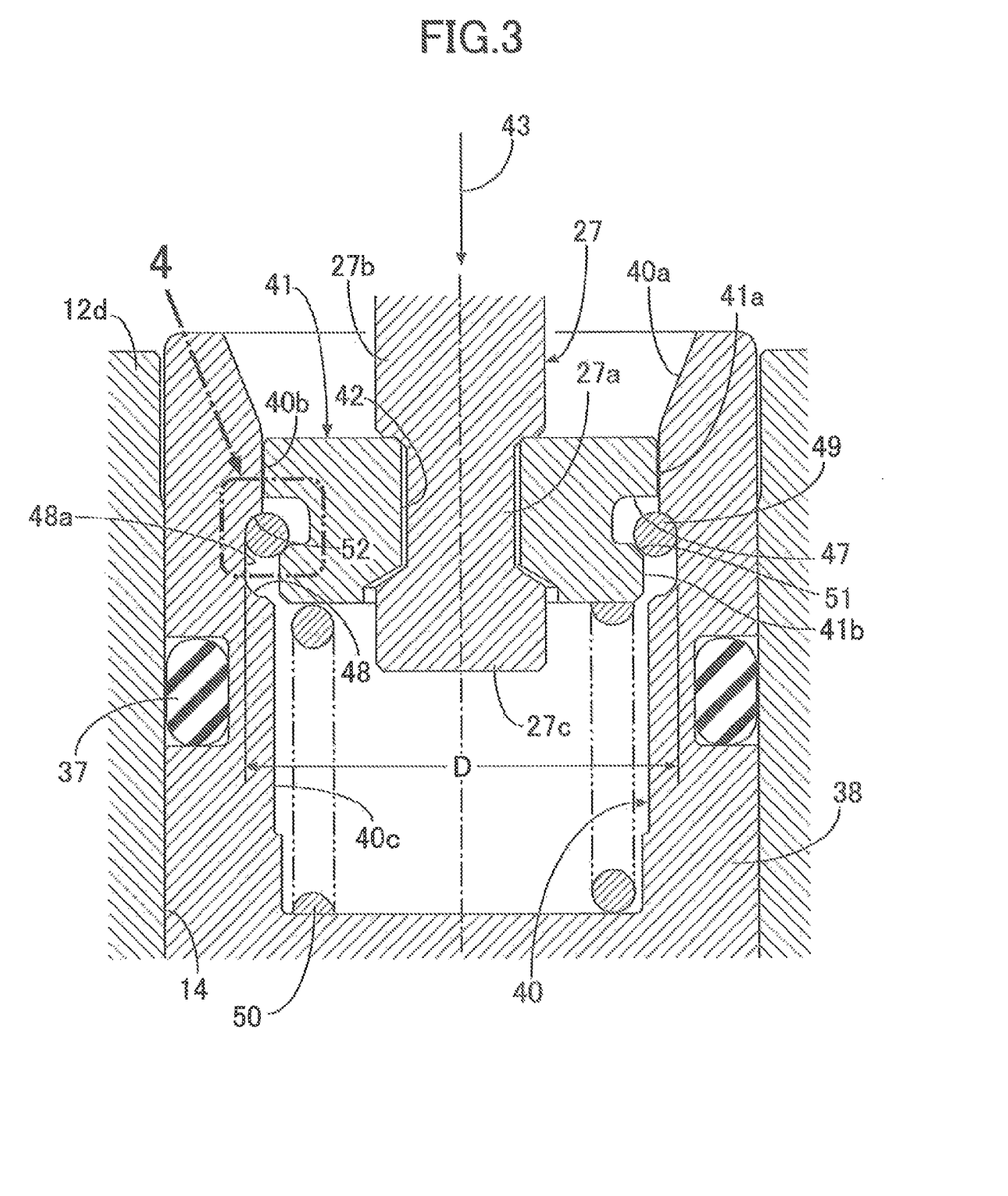
FIG. 3 is an enlarged longitudinal cross-sectional view of a connection part where a valve shaft and a diaphragm rod are connected together.

Referring to FIG. 3 together, a bottomed connection hole 40 opened toward the decompression valve body 10 is coaxially provided to the diaphragm rod 38. Meanwhile, a reduced-diameter shaft portion 27a as well as first and second enlarged-diameter shaft portions 27b, 27c are provided to a diaphragm rod 38-side end portion of the valve shaft 27 which penetrates through the valve hole 24 and extends towards the diaphragm rod 38. The first and second enlarged-diameter shaft portions 27b, 27c are larger in diameter than the reduced-diameter shaft portion 27a, and are respectively provided to opposite sides of the reduced-diameter shaft portion 27a in an axial direction. The first enlarged-diameter shaft portion 27b is disposed closer to the decompression valve body 10, while the second enlarged-diameter shaft portion 27c is disposed closer to the diaphragm 8.

A holding plate 41 is fitted into the connection hole 40. The holding plate 41 includes: a large-diameter portion 41a disposed closer to the decompression valve body 10; and a small-diameter portion 41b disposed closer to a closed end of the connection hole 40.

The holding plate 41 is attached to the valve shaft 27. The holding plate 41 is provided with a lock recessed portion 42. The reduced-diameter shaft portion 27a loosely penetrates through the lock recessed portion 42. The lock recessed portion 42 engages with end surfaces of the respective first and second enlarged-diameter shaft portions 27b, 27c on a reduced-diameter shaft portion 27a side. The lock recessed portion 42 is opened toward one side.

A first lock groove 47 disposed between the large-diameter portion 41a and the small-diameter portion 41b is provided to an outer periphery of the holding plate 41.

Meanwhile, an annular second lock groove 48 corresponding to the first lock groove 47 is provided to an inner periphery of the connection hole 40. A lock ring 49, which is an elastic ring having a substantially C shape and one opening and has a circular section, engages with the first and second lock grooves 47, 48 so as to be able to expand and contract in a radial direction of the valve shaft 27. In other words, the holding plate 41 as a first member, and the diaphragm rod 38 as a second member are connected together via the lock ring 49.

An outer diameter of the lock ring 49 under a load-free condition in which no external force acts on the lock ring 49 is set equal to or larger than a diameter D of a groove bottom surface 48a of the second lock groove 48.

Starting from an opening end side of the connection hole 40 toward the valve seat member 26, and sequentially in an insertion direction 43 of the holding plate 41 into the connection hole 40, the connection hole 40 includes: a tapered hole portion 40a whose diameter becomes gradually larger outward in a tapered manner; a reduced-diameter guide hole portion 40b whose diameter is smaller than or equal to a small-diameter end of the tapered hole portion 40a; and a bottomed hole portion 40c formed larger in diameter than the reduced-diameter guide hole portion 40b. The second lock groove 48 is disposed between the reduced-diameter guide hole portion 40b and the bottomed hole portion 40c.

The reduced-diameter guide hole portion 40b is adjacently disposed short of the second lock groove 48 in the insertion direction 43, and forms a part of the connection hole 40. The reduced-diameter guide hole portion 40b guides the lock ring 49 to the second lock groove 48 side while reducing the diameter of the lock ring 49, when the holding plate 41 is inserted into the connection hole 40 with the lock ring 49 engaging with the first lock groove 47.

Furthermore, a depth d from an inner peripheral surface of the reduced-diameter guide hole portion 40b to the groove bottom surface 48a of the second lock groove 48 is set less than a radius R of the circular section of the lock ring 49.

Figure 4:
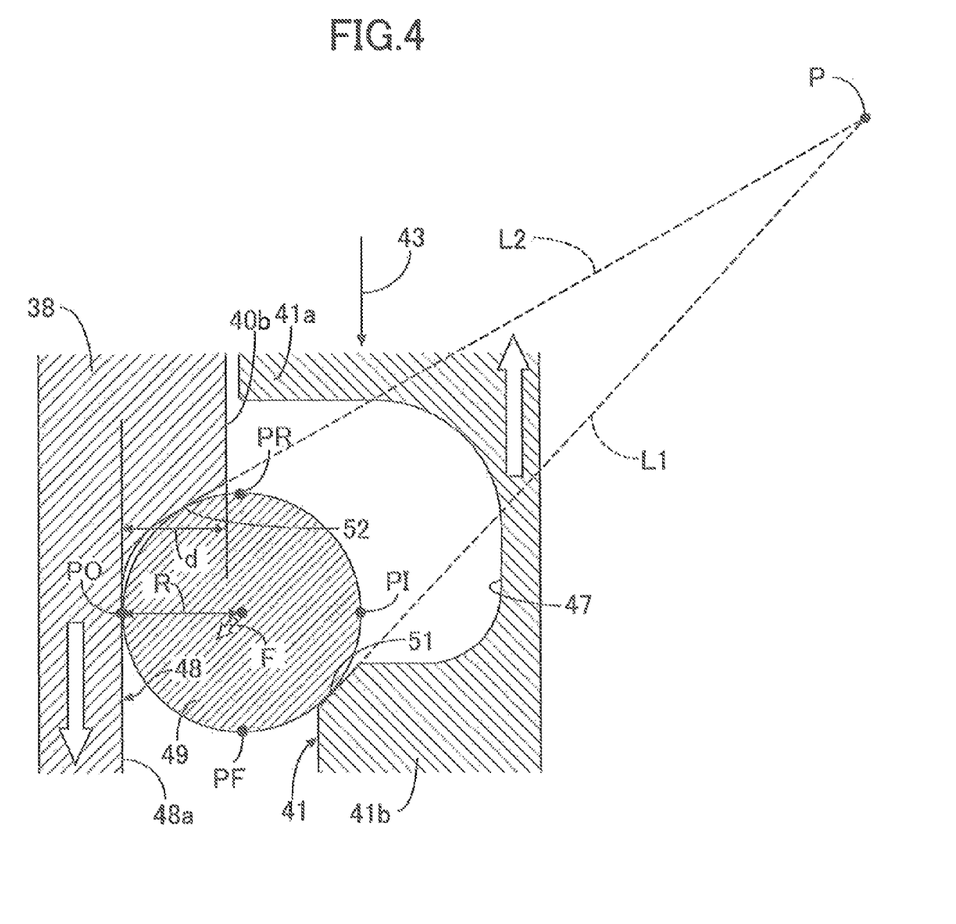
FIG. 4 is an enlarged view of a section indicated with an arrow 4 of FIG. 3.

Referring to FIG. 4 together, when the holding plate 41 and the diaphragm rod 38 connected together via the lock ring 49 are acted on by external force in a direction of separating the holding plate 41 and the diaphragm rod 38 from each other, the lock ring 49 comes into contact with a forward side surface of the first lock groove 47 of the holding plate 41 in the insertion direction 43, and with a rearward side surface of the second lock groove 48 of the diaphragm rod 38 in the insertion direction 43. A first slant face 51 is formed in the holding plate 41 and configured so as to form part of the forward side surface of the first lock groove 47 in the insertion direction 43. As shown in the drawings, the first slant face is disposed in a first orientation, which is neither parallel nor perpendicular to a central axis of the first member. A second slant face 52 is formed in the diaphragm rod 38 and configured so as to form the rearward side surface of the second lock groove 48 in the insertion direction 43. As shown in the drawings, the second slant face is disposed in a second orientation which is neither parallel nor perpendicular to the central axis of the first member, and is different from the first orientation. The first slant face 51 is designed to come into contact with part of an outer periphery of the circular section of the lock ring 49 which is between a front end PF of the outer periphery in the insertion direction 43 and an inner end PI of the outer periphery in the radial direction. The second slant face 52 is designed to come into contact with part of the outer periphery of the circular section of the lock ring 49 which is between a rear end PR of the outer periphery in the insertion direction 43 and an outer end PO of the outer periphery in the radial direction.

Moreover, the first slant face 51 and the second slant face 52 are formed in a way that an intersection point P of extension lines L1, L2 from the respective slant faces 51, 52 exists inside the lock ring 49 in the radial direction.

A set spring 50 for biasing the holding plate 41 to a valve opening direction of the decompression valve body 10 is compressed and installed between the closed end of the connection hole 40 and the holding plate 41. Thus, the lock ring 49 and an inner side surface of the first lock groove 47 on a set spring 50 side are held in contact with each other, while the lock ring 49 and an inner side surface of the second lock groove 48 on a decompression valve body 10 side are held in contact with each other.

Returning to FIG. 1, a diaphragm cover 55 is fastened to a side of the first body member 12, which is opposite from the second body member 13, in a way that a peripheral edge portion of the diaphragm 8 is clamped between the diaphragm cover 55 and the first body member 12. The diaphragm cover 55 has an end wall 55a in its side opposite from the first body member 12, and is formed in a bottomed cylindrical shape. The diaphragm rod 38 is connected to a central portion of the diaphragm 8. In other words, the diaphragm rod 38 coaxially and integrally includes a shaft portion 38a which extends in a direction opposite to the direction in which the connection hole 40 is opened. The central portion of the diaphragm 8 is connected to the shaft portion 38a by: inserting the shaft portion 38a into a ring-shaped first retainer 56 sandwiched between the diaphragm rod 38 and the central portion of the diaphragm 8, and a ring-shaped second retainer 57 sandwiching the central portion of the diaphragm 8 between the second retainer 57 and the first retainer 56; making a portion of the shaft portion 38a protrude from the second retainer 57; and swaging part of an outer periphery of the shaft portion 38a by the protruding portion thereof so as to engage the shaft portion 38a with the second retainer 57. Furthermore, an annular seventh seal member 58 is installed between the diaphragm rod 38 and the first retainer 56.

A pressure action chamber 59 facing one surface of the diaphragm 8 is formed between the diaphragm 8 and the first body member 12. A control pressure chamber 60 facing the other surface of the diaphragm 8 is formed between the diaphragm 8 and the diaphragm cover 55. The first body member 12 is provided with a communication passage 61 for communicating the outlet passage 19, which leads to the decompression chamber 18, with the pressure action chamber 59. Furthermore, a coil-shaped diaphragm spring 62 housed in the control pressure chamber 60 is compressed and installed between the diaphragm cover 55 and the diaphragm 8. A negative pressure introduction pipe 63 leading to the control pressure chamber 60 is connected to the diaphragm cover 55. The negative pressure introduction pipe 63 is connected to the engine, and is configured to introduce intake negative pressure of the engine to the control pressure chamber 60.

A support tube 64 protruding toward the control pressure chamber 60 is integrally provided in a central portion of the end wall 55a of the diaphragm cover 55. An adjustment screw 65 capable of being rotationally manipulated from an outside of the diaphragm cover 55 is screwed to the support tube 64 so as to make one end of the adjustment screw 65 enter the control pressure chamber 60. An annular eighth seal member 66 is installed between the support tube 64 and the adjustment screw 65. In addition, a spring seat member 67 is housed in the control pressure chamber 60. The spring seat member 67 has a bottomed cylindrical shape and is configured to cover the support tube 64 with one end portion of the adjustment screw 65 put in contact with a central portion of a closed end of the spring seat member 67. The diaphragm spring 62 is compressed and installed between the spring seat member 67 and the second retainer 57 which is fixed to the central portion of the diaphragm 8. The spring seat member 67 can be driven to advance and retreat by the rotational manipulation of the adjustment screw 65. Thereby, spring load of the diaphragm spring 62 can be adjusted.

In the decompression valve 6 like this, when pressure in the pressure action chamber 59, namely pressure in the decompression chamber 18, bends the diaphragm 8 toward the control pressure chamber 60 against spring force of the diaphragm spring 62, the diaphragm rod 38 pulls the valve shaft 27 via the holding plate 41 so that the decompression valve body 10 gets seated on the decompression valve seat 25 so as to be closed. On the other hand, when a decrease in the pressure in the pressure action chamber 59 bends the diaphragm 8 toward the pressure action chamber 59, the diaphragm rod 38 pushes the valve shaft 27 via the holding plate 41 so that the decompression valve body 10 gets off the decompression valve seat 25 so as to be opened. The repetition of the decompression valve 6 getting on and off the decompression valve seat 25 decompresses high-pressure fuel gas from the valve chamber 31, and introduces the resultant fuel gas to the decompression chamber 18.

Meanwhile, as described above, the set spring 50 for biasing the holding plate 41 to the valve opening direction of the decompression valve body 10 is compressed and installed in the connection hole 40 of the diaphragm rod 38. Thereby, the lock ring 49 and the inner side surface of the first lock groove 47 of the holding plate 41 on the set spring 50 side are held in contact with each other, while the lock ring 49 and the inner side surface of the second lock groove 48 of the diaphragm rod 38 on the decompression valve body 10 side are held in contact with each other. Accordingly, their contact states can be kept during pushing and pulling of the diaphragm 8 with respect to the valve shaft 27. For this reason, it is possible to prevent a phenomenon where the contact portions repeatedly abut on and separate from each other, which causes unusual noises. In addition, the decompression valve body 10 responds to movement of the diaphragm 8 without delay. This makes it possible to contribute to enhancement of pressure adjusting performance.

A solenoid housing 68 of the solenoid 9 for the shut-off valve 7 is formed in a bottomed cylindrical shape which is closed at its side opposite from the second body member 13 of the body 5. A holder 69 integrally including a cylindrical portion 69a, on whose outer periphery a male thread to be screwed to the threaded hole portion 15a of the housing hole 15 in the second body member 13 is carved, is fixed to an open end of the solenoid housing 68 on a second body member 13 side. The solenoid housing 68 is fixed to the second body member 13 by screwing the male thread to the threaded hole portion 15a.

In addition, the solenoid 9 includes: a movable core 70; and a guide tube 71 which is made of a nonmagnetic material, and into which the movable core 70 is inserted so as to be movable in the axial direction. One end portion of the guide tube 71 penetrates through the holder 69, and enters the housing hole 15 in the second body member 13. The guide tube 71 integrally includes: a small-diameter portion 71a penetrating through the holder 69; and a large-diameter portion 71b formed larger in diameter than the small-diameter portion 71a, fitted in the fitting hole portion 15b of the housing hole 15, and coaxially continuing to one end of the small-diameter portion 71a. The guide tube 71 is fixed to the second body member 13.

A small-diameter hole 74 and a large-diameter hole 75 are formed in the guide tube 71 so as to be coaxially connected to each other in an intermediate portion of the large-diameter portion 71b in the axial direction. The movable core 70 is coaxially inserted in the small-diameter hole 74. The large-diameter hole 75 is formed larger in diameter than the small-diameter hole 74, and is opened to one end of the large-diameter portion 71b.

Moreover, the one end of the large-diameter portion 71b comes in contact with the holding portion 28a of the housing 28 from a side opposite to the second inward-facing flange portion 13b. The guide tube 71 is fixed to the second body member 13 in a way that the housing 28 is clamped between the guide tube 71 and the second inward-facing flange portion 13b. An annular ninth seal member 76 and a second backup ring 77, which are elastically in contact with an inner periphery of the fitting hole portion 15b, are attached to an outer periphery of the large-diameter portion 71b.

Furthermore, in the guide tube 71, an annular step portion 71c directed in a direction opposite to the second inward-facing flange portion 13b is formed in a continuous connection portion between the small-diameter portion 71a and the large-diameter portion 71b. The one end of the cylindrical portion 69a of the holder 69, which is screwed to the threaded hole portion 15a of the housing hole 15, comes into contact with the step portion 71c. Thus, the holder 69 is screwed to the threaded hole portion 15a in the end portion of the housing hole 15, which is opposite from the diaphragm 8, in a way that the large-diameter portion 71b of the guide tube 71 and the holding portion 28a of the housing 28 are clamped between the holder 69 and the second inward-facing flange portion 13b.

The shut-off valve 7 includes: a main valve body 78 having a pilot port 80; and an auxiliary valve body 79 opening and closing the pilot port 80 by its movement relative to the main valve body 78 within a predetermined range, and assembled to the main valve body 78 so as to be movable relative to the main valve body 78 within the predetermined range. Thereby, the shut-off valve 7 is formed as a valve with the pilot function. The auxiliary valve body 79 is formed in an end portion of the movable core 70. Meanwhile, the main valve body 78 is inserted into the fitting hole portion 15b of the housing hole 15 in the second body member 13, and the housing 28 of the decompression valve 6 is coaxially housed in the main valve body 78.

The main valve body 78 includes: a stepped cylindrical portion 78a which coaxially covers the large-diameter cylindrical portion 28b and the small-diameter cylindrical portion 28c of the housing 28; a flange portion 78b bulging radially outward from one end of the stepped cylindrical portion 78a, and facing the holding portion 28a of the housing 28 from a side opposite to the second inward-facing flange portion 13b; and an end wall portion 78c having the pilot port 80, which is coaxial with a center axis of the stepped cylindrical portion 78a, in its central portion, and closing the other end portion of the stepped cylindrical portion 78a. The main valve body 78 is formed in a bottomed cylindrical shape. A protrusion 78d forming a part of the pilot port 80 is integrally provided on an outer surface of a central portion of the end wall portion 78c of the main valve body 78 so as to protrude toward the movable core 70. The stepped cylindrical portion 78a of the main valve body 78 is coaxially inserted in the small-diameter hole 74 of the guide tube 71, while the flange portion 78*b* is coaxially disposed inside the large-diameter hole 75 of the guide tube 71.

An annular first rubber seal 81 is buried in the flange portion 78*b* of the main valve body 78 so as to face a surface of the holding portion 28*a* of the housing 28 which is opposite from the second inward-facing flange portion 13*b*. A shut-off valve seat 82, on which the first rubber seal 81 is capable of being seated, is formed in the housing 28. The shut-off valve seat 82 annularly projecting in order for the first rubber seal 81 to be seated on the shut-off valve seat 82 is formed on the holding portion 28*a* of the housing 28.

Between the ninth seal member 76 and the holding portion 28*a* of the housing 28, an annular recessed portion 83 is provided in the outer periphery of the large-diameter portion 71*b* of the guide tube 71. An inlet passage 84 leading to the annular recessed portion 83 is provided in the second body member 13. A connection member 85 is attached to a side surface of the second body member 13. A conduit for guiding the high-pressure fuel gas is connected to the connection member 85, and leads to the inlet passage 84 through the connection member 85.

The large-diameter portion 71*b* of the guide tube 71 is provided with multiple first communication holes 86 for communicating the annular recessed portion 83 with the large-diameter hole 75. The large-diameter cylindrical portion 28*b* of the housing 28 is provided with multiple second communication holes 87 which communicate with the valve chamber 31 of the decompression valve 6. Accordingly, the inlet passage 84, the annular recessed portion 83, the first communication holes 86 and the second communication holes 87 form a high-pressure passage 88 for introducing the high-pressure fuel gas to the decompression valve 6 side. The main valve body 78 of the shut-off valve 7 and the shut-off valve seat 82 are disposed between the first and second communication holes 86, 87 which are located in an intermediate portion of the high-pressure passage 88.

The auxiliary valve body 79 is integrally formed in the end portion of the movable core 70 so as to form a bottomed connection hole 90 into which to insert an insertion portion 91 provided to the main valve body 78. The insertion portion 91 is formed from a part of the stepped cylindrical portion 78*a* and the end wall portion 78*c* of the main valve body 78. A pilot valve chamber 92 is formed between the auxiliary valve body 79 and the main valve body 78. A first passage 93 for communicating the first communication holes 86, which communicate with the inlet passage 84 via the annular recessed portion 83, with the pilot valve chamber 92 is formed between the guide tube 71 and the main valve body 78. A second passage 94 for communicating the second communication holes 87, which communicate with the valve chamber 31, with the pilot port 80 is formed between the housing 28 and the main valve body 78.

A second rubber seal 95 is buried in a central portion of a closed end of the connection hole 90. Depending on whether or not the solenoid 9 is electrified, the movable core 70, namely the auxiliary valve body 79, operates to switch the pilot port 80 between a state (a state shown in FIG. 1) of being closed with the second rubber seal 95 put into contact with the protrusion 78*d* of the main valve body 78 in the insertion portion 91 and a state of being opened with the second rubber seal 95 put away from the protrusion 78*d*.

Meanwhile, the main valve body 78 as a first member, and the auxiliary valve body 79 as a second member are connected together so as to be movable relative to each other in the axial direction within the predetermined range. An annular first lock groove 96 is formed in an outer periphery of the insertion portion 91 in the main valve body 78. A lock ring 98 is engaged with the first lock groove 96. The lock ring 98 has a C shape capable of elastically changing its shape, such as expanding and contracting, depending on how external force acts on the lock ring 98. In addition, an annular second lock groove 97, which is opened to an inner periphery of the connection hole 90, is formed in the auxiliary valve body 79 in a way that the lock ring 98 engages with the second lock groove 97. The second lock groove 97 is formed long enough in the axial direction to enable the main valve body 78 and the auxiliary valve body 79 to move relative to each other in the axial direction within the predetermined range.

The connecting structure like this for connecting the main valve body 78 and the auxiliary valve body 79, albeit not described in detail, is formed like the connecting structure for connecting the holding plate 41 and the diaphragm rod 38 in the decompression valve 6.

Furthermore, while the solenoid 9 is not electrified, the auxiliary valve body 79 is out of operation, and thus leaves the pilot port 80 closed as shown in FIG. 1. In this case, a gap extending in a direction of the movement of the main valve body 78 and the auxiliary valve body 79 is caused between the lock ring 98 and a side surface on an open end side of the auxiliary valve body 79 which is one of the opposite side surfaces of the second lock groove 97 in the axial direction. On the other hand, when the solenoid 9 is electrified, the auxiliary valve body 79 moves in a direction in which the pilot port 80 becomes opened. Once the pilot port 80 opens, the side surface on the open end side of the auxiliary valve body 79, which is one of the opposite side surfaces of the second lock groove 97 in the axial direction, engages with the lock ring 98. Thereby, the main valve body 78 is driven toward the valve-opened position.

When the engine is stopped, the solenoid 9 is stopped from being electrified. Thereby, the shut-off valve 7 stops the supply of the high-pressure fuel gas to the valve chamber 31 side by: moving the movable core 70 toward the main valve body 78; as shown in FIG. 2, seating the first rubber seal 81 of the main valve body 78 on the shut-off valve seat 82, and disconnecting the first communication holes 86 from the second communication holes 87; and concurrently bringing the second rubber seal 95 of the auxiliary valve body 79 into contact with the protrusion 78*d*, closing the pilot port 80, and thereby disconnecting the pilot valve chamber 92 from the second passage 94.

On the other hand, once the solenoid 9 is electrified in order to start the operation of the engine, first of all, the movable core 70 moves in the direction of separating the second rubber seal 95 of the auxiliary valve body 79 from the protrusion 78*d* forming the pilot port 80, and the second passage 94 communicating with the valve chamber 31 via the second communication holes 87 communicates with the pilot valve chamber 92 via the pilot port 80. Thereby, the high-pressure fuel gas starts to gradually flow from the inlet passage 84 to the pilot port 80 via the annular recessed portion 83, the first communication holes 86, the first passage 93 and the pilot valve chamber 92. Thus, a difference between pressures acting on the respective opposite sides of the main valve body 78 becomes smaller.

When driving force of the solenoid 9 becomes stronger than force acting on the main valve body 78 in the valve-closing direction which is based on the pressure difference, the auxiliary valve body 79 is engaged with the lock ring 98. Thereby, the auxiliary valve body 79 connected to the main valve body 78, namely the movable core 70, moves further. The first rubber seal 81 of the main valve body 78 gets off the shut-off valve seat 82. Thus, the fuel gas starts to flow from the high-pressure passage 88 to the valve chamber 31 side.

Next, descriptions will be provided for an operation of the embodiment. The first lock groove 47 is formed in the outer periphery of the holding plate 41 which forms a part of the decompression valve 6 opening and closing in response to the movement of the decompression valve body 10 caused by the operation of the diaphragm 8, and which is connected to the decompression valve body 10 side. The holding plate 41 and the diaphragm rod 38 are connected together via the lock ring 49. The diaphragm rod 38 includes the connection hole 40 permitting insertion of the holding plate 41 therethrough, is provided with the second lock groove 48 opened to the inner periphery of the connection hole 40, and is connected to the diaphragm 8 side. The lock ring 49 is formed in a substantially C shape while having the circular section, and engages with the first and second lock grooves 47, 48. The outer diameter of the lock ring 49 under the load-free condition is set equal to or larger than the diameter D of the groove bottom surface 48a of the second lock groove 48. The reduced-diameter guide hole portion 40b for guiding the lock ring 49 to the second lock groove 48 side while reducing the diameter of the lock ring 49 when the holding plate 41 is inserted into the connection hole 40 with the lock ring 49 engaging with the first lock groove 47, forms the part of the connection hole 40, and is adjacently disposed short of the second lock groove 48 in the insertion direction 43 of the holding plate 41 into the connection hole 40. The depth d from the inner peripheral surface of the reduced-diameter guide hole portion 40b to the groove bottom surface 48a of the second lock groove 48 is set less than the radius R of the circular section of the lock ring 49.

Accordingly, it is possible to reduce an amount by which the diameter of the lock ring 49 is reduced by the reduced-diameter guide hole portion 40b when the holding plate 41 is inserted into the connection hole 40 with the lock ring 49 engaging with the first lock groove 47. It is possible to decrease force with which the holding plate 41 is inserted into the connection hole 40 by reducing the diameter of the lock ring 49. Furthermore, the reduction in the amount of the deformation of the lock ring 49 makes it possible to prevent the occurrence of failure in the engagement of the lock ring 49 due to its plastic deformation. Thus, it is possible to enhance ease of assembly, and reliability, of the connecting structure for the decompression valve 6 between the diaphragm 8 and the decompression valve body 10.

In addition, in a state where the holding plate 41 and the diaphragm rod 38 connected together via the lock ring 49 are acted on by the external force in the direction of separating the holding plate 41 and the diaphragm rod 38 from each other, the first slant face 51, which comes into contact with part of the outer periphery of the circular section of the lock ring 49 between the front end PF in the insertion direction 43 and the inner end PI in the radial direction, is formed in the holding plate 41, and the second slant face 52, which comes into contact with part of the outer periphery of the circular section of the lock ring 49 between the rear end PR in the insertion direction 43 and the outer end PO in the radial direction, is formed in the diaphragm rod 38. For these reasons, when the holding plate 41 and the diaphragm rod 38 are acted on by the external force in the direction of separating the holding plate 41 and the diaphragm rod 38 from each other, the holding plate 41 and the diaphragm rod 38 come into surface contact with the lock ring 49. Thus, it is possible to eliminate a likelihood that corners of the holding plate 41 and the diaphragm rod 38 hit the lock ring 49 so as to abrade and bite into the lock ring 49.

Furthermore, the first and second slant faces 51, 52 are formed in the way that the intersection point P of the extension lines L1, L2 from the respective slant faces 51, 52 exists inside the lock ring 49 in the radial direction. For this reason, when the holding plate 41 and the diaphragm rod 38 connected together via the lock ring 49 are acted on by the external force in the direction of separating the holding plate 41 and the diaphragm rod 38 from each other, resultant force F of forces acting on the lock ring 49 from the respective first and second slant faces 51, 52 is directed outward, as shown in FIG. 4. Thus, the outward movement of the lock ring 49 is restricted by the groove bottom surface 48a of the second lock groove 48. Accordingly, the lock ring 49 is unlikely to come out of the second lock groove 48, as well as the holding plate 41 and the diaphragm rod 38 are securely kept connected to each other.

Figure 5:
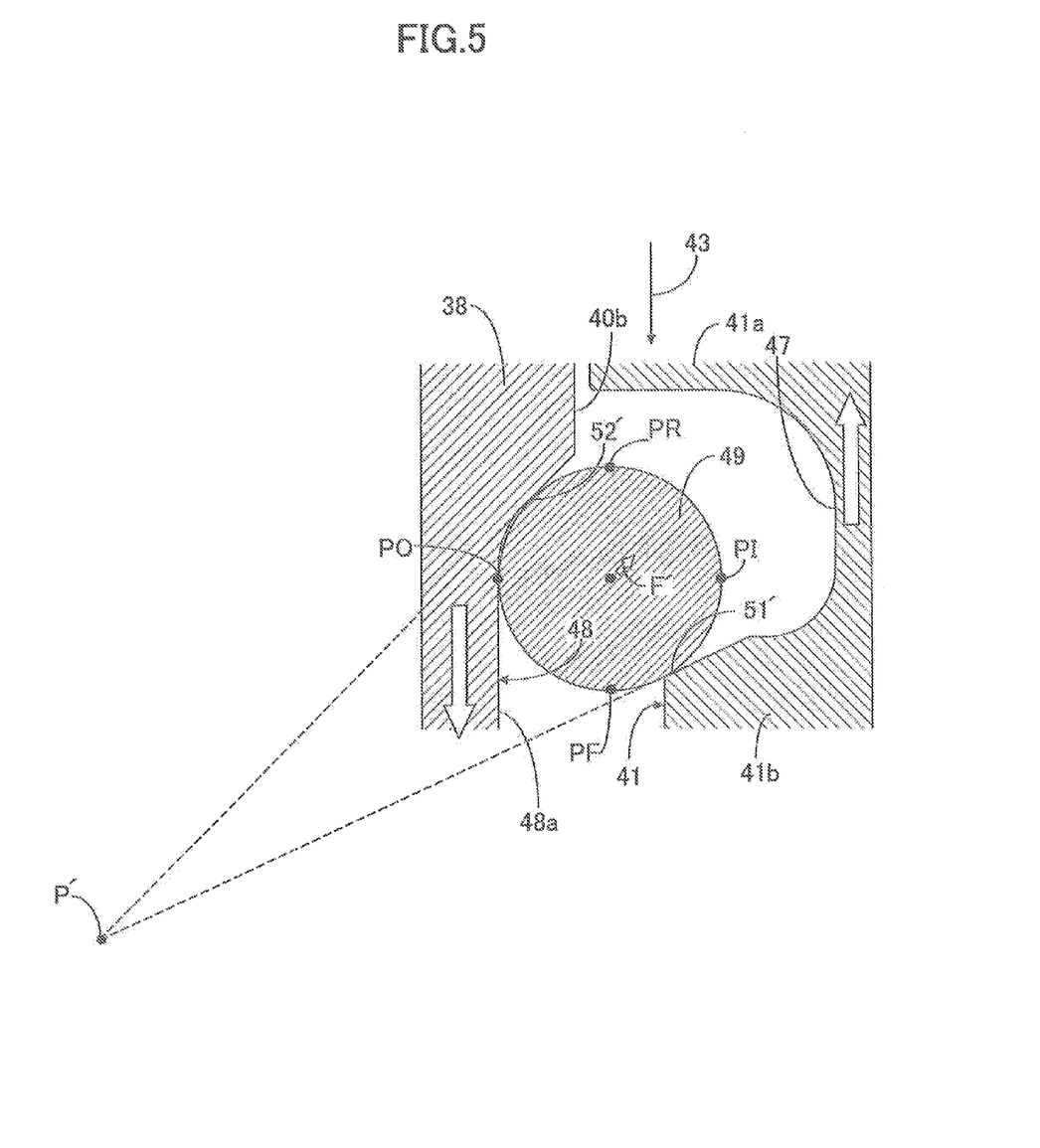
FIG. 5 is a view of a reference example, which corresponds to FIG. 4.

In contrast to this, as in a reference example shown in FIG. 5, in the state where the holding plate 41 and the diaphragm rod 38 are acted on by the external force in the direction of separating the holding plate 41 and the diaphragm rod 38 from each other, a first slant face 51' is formed in the holding plate 41 so as to come into contact with part of the outer periphery of the circular section of the lock ring 49 between the front end PF in the insertion direction 43 and the inner end PI in the radial direction; and a second slant face 52' is formed in the diaphragm rod 38 so as to come into contact with part of the outer periphery of the circular section of the lock ring 49 between the rear end PR in the insertion direction 43 and the outer end PO in the radial direction. An extension line L1' from the first slant face 51' and an extension line L2' from the second slant face 52' intersect each other at an intersection point P1' which is outside the lock ring 49 in the radial direction. In this case, when the holding plate 41 and the diaphragm rod 38 are acted on by the external force in the direction of separating the holding plate 41 and the diaphragm rod 38 from each other, the resultant force F' of forces acting on the lock ring 49 from the respective first and second slant faces 51', 52' is directed inward. For this reason, the lock ring 49 moves inward, and is likely to come out of the second lock groove 48.

Furthermore, the main valve body 78 having the pilot port 80, and the auxiliary valve body 79 which opens and closes the pilot port 80 by its movement relative to the main valve body 78 within the predetermined range, and which together with the main valve body 78, forms part of the shut-off valve 7 with the pilot function, are connected to each other using the connecting structure which is similar to the connecting structure for connecting the holding plate 41 and the diaphragm rod 38 in the decompression valve 6. For this reason, it is possible to enhance ease of assembly, and reliability, of the connecting structure for connecting the main valve body 78 and the auxiliary valve body 79 in the shut-off valve 7 with the pilot function.

Although the foregoing descriptions have been provided for the embodiment of the present invention, the present invention is not limited to the embodiment. Various design modifications can be made to the present invention without departing from the present invention as recited in the claims.

What is claimed is:

1. A two-member connecting structure comprising:
   a first member, which is provided with a first lock groove in an outer periphery thereof;
   a second member, which includes a connection hole permitting insertion of the first member therethrough, the second member being provided with a second lock groove opened to an inner periphery of the connection hole, and a lock ring being formed in a substantially C shape while having a circular section, and engaging with the first and second lock grooves, wherein:
an outer diameter of the lock ring under a load-free condition is set equal to or larger than a diameter of a groove bottom surface of the second lock groove, a guide hole portion forms part of the connection hole, and is adjacently disposed short of the second lock groove in an insertion direction of the first member into the connection hole, the guide hole portion guiding the lock ring to a side of the second lock groove while reducing a diameter of the lock ring when the first member is inserted into the connection hole with the lock ring engaging with the first lock groove, a depth of the second lock groove, from an inner peripheral surface of the guide hole portion to the groove bottom surface is set less than a radius of the circular section of the lock ring, and in a state where the first member and the second member, connected together via the lock ring, are acted on by external force in a direction of separating the first member and the second member from each other, a first slant face is formed in the first member, the first slant face disposed in a first orientation which is neither parallel nor perpendicular to the central axis of the first member, the first slant face coming into contact with part of an outer periphery of the circular section of the lock ring between a front end in the insertion direction and an inner end in a radial direction, a second slant face is formed in the second member, the second slant face disposed in a second orientation which is neither parallel nor perpendicular to the central axis of the first member and is different from the first orientation, the second slant face coming into contact with part of the outer periphery of the circular section of the lock ring between a rear end in the insertion direction and an outer end in the radial direction, and the first slant face and the second slant face are formed such that an intersection point of extension lines from the respective slant faces exists inside the lock ring in the radial direction.

2. The two-member connecting structure according to claim 1, wherein a member, which forms part of a decompression valve opening and closing in response to movement of a decompression valve body caused by operation of a diaphragm and is connected on a side of the decompression valve body, and a member, which is connected on a side of the diaphragm, are connected together such that one of the members is the first member, and the other is the second member.

3. The two-member connecting structure according to claim 1, wherein a main valve body and an auxiliary valve body are connected to each other such that one of the main valve body and the auxiliary valve body is the first member, the other is the second member, and an amount of relative movement between the main valve body and the auxiliary valve body is controlled, the main valve body having a pilot port, and the auxiliary valve body opening and closing the pilot port by its movement relative to the main valve body within a predetermined range, and forming part of a valve with a pilot function together with the main valve body.

* * * * *